(12) United States Patent
Qin

(10) Patent No.: US 10,075,374 B2
(45) Date of Patent: Sep. 11, 2018

(54) SETTING SDN FLOW ENTRIES

(71) Applicant: HANGZHOU H3C TECHNOLOGIES CO., LTD., Zhejiang (CN)

(72) Inventor: Zhixiang Qin, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 47 days.

(21) Appl. No.: 15/307,878

(22) PCT Filed: Apr. 29, 2015

(86) PCT No.: PCT/CN2015/077782
§ 371 (c)(1),
(2) Date: Oct. 31, 2016

(87) PCT Pub. No.: WO2015/165399
PCT Pub. Date: Nov. 5, 2015

(65) Prior Publication Data
US 2017/0063689 A1   Mar. 2, 2017

(30) Foreign Application Priority Data

Apr. 30, 2014 (CN) .......................... 2014 1 0184141
Mar. 20, 2015 (CN) .......................... 2015 1 0124353

(51) Int. Cl.
*H04L 12/741* (2013.01)
*H04L 12/721* (2013.01)
(Continued)

(52) U.S. Cl.
CPC ........ *H04L 45/745* (2013.01); *H04L 12/6418* (2013.01); *H04L 45/38* (2013.01);
(Continued)

(58) Field of Classification Search
CPC ..... H04L 12/6418; H04L 45/38; H04L 45/54; H04L 45/745; H04L 47/24; H04L 49/25; H04L 49/9026
See application file for complete search history.

(56) References Cited

U.S. PATENT DOCUMENTS

2013/0046882 A1   2/2013   Takashima et al.
2014/0052836 A1*  2/2014   Nguyen ................ H04L 45/306
                                                     709/223
(Continued)

FOREIGN PATENT DOCUMENTS

CN   102685006 A   9/2012
CN   103152271 A   6/2013

OTHER PUBLICATIONS

International Search Report and Written Opinion, International Application No. PCT/CN2015/077782, dated Jul. 23, 2015, pp. 1-9, SIPO.

*Primary Examiner* — Kashif Siddiqui
(74) *Attorney, Agent, or Firm* — Hewlett Packard Enterprise Patent Department

(57) ABSTRACT

A method for setting software defined network (SDN) flow entries. A packet transmitted from a host is received, and a local flow table of the SDN switch for a flow entry that matches address information of the packet is searched. In response to determining that the packet matches a default flow entry in the local flow table, the packet is transmitted to a SDN controller according to the default flow entry. A first flow entry in the local flow table is set according to a source address, a destination address and an input port of the packet. A priority of the first flow entry is higher than a priority of the default flow entry. An action of the first flow entry is a non-forwarding action.

16 Claims, 5 Drawing Sheets

(51) Int. Cl.
*H04L 12/851* (2013.01)
*H04L 12/879* (2013.01)
*H04L 12/947* (2013.01)
*H04L 12/64* (2006.01)

(52) U.S. Cl.
CPC .............. *H04L 45/54* (2013.01); *H04L 47/24* (2013.01); *H04L 49/25* (2013.01); *H04L 49/9026* (2013.01)

(56) References Cited

U.S. PATENT DOCUMENTS

| | | |
|---|---|---|
| 2014/0098669 A1 | 4/2014 | Garg et al. |
| 2014/0112150 A1 | 4/2014 | Ko et al. |
| 2015/0249572 A1* | 9/2015 | Mack-Crane ........... H04L 45/38 709/222 |

* cited by examiner

SETTING SDN FLOW ENTRIES

BACKGROUND

Software defined network (SDN) is a new network architecture. By separating control plane and data plane of network devices, such as traditional switches or routers, flexible control of network flows can be achieved in order to provide a good platform for core networks and application innovation. OpenFlow protocol is one of open protocols for realizing SDN technology. With advances in network technology, SDN technology continues to develop as well; however, there is still plenty of room for further optimization.

BRIEF DESCRIPTION OF DRAWINGS

Features of the present disclosure are illustrated by way of an example and not limited in the following figure(s), in which like numerals indicate like elements, in which.

DETAILED DESCRIPTION

For simplicity and illustrative purposes, a disclosure is described by referring mainly to an example thereof. In the following description, numerous specific details are set forth in order to provide a thorough understanding of the disclosure of the application. It will be readily apparent however, that the disclosure may be practiced without limitation to these specific details. In other instances, some methods and structures have not been described in detail so as not to unnecessarily obscure the disclosure. As used herein, the terms "a" and "an" are intended to denote at least one of a particular element, the term "includes" means includes but not limited to, the term "including" means including but not limited to, and the term "based on" means based at least in part on.

Figure 1:
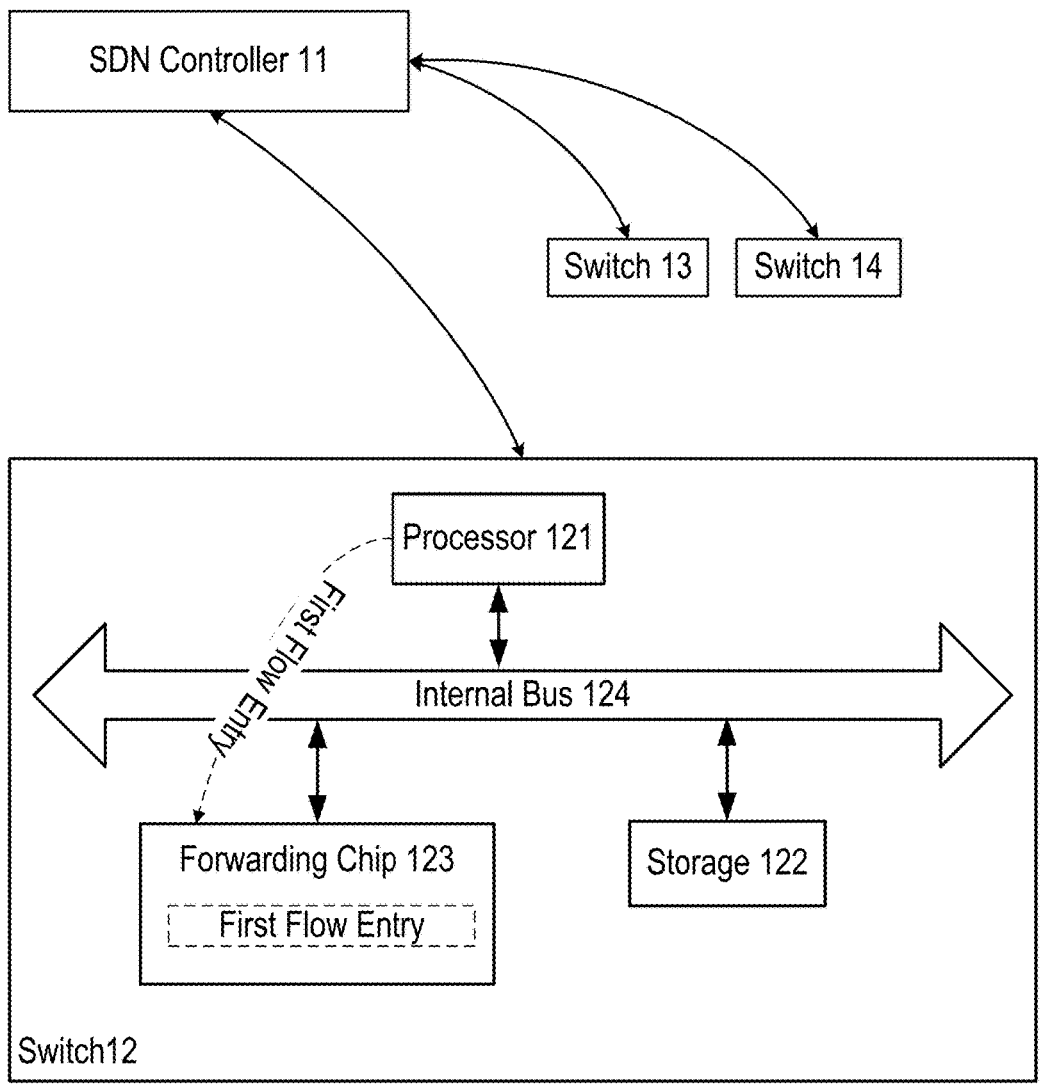
FIG. 1 is an architecture diagram of a SDN network containing at least one switches and a SDN controller according to an example of the present disclosure.

FIG. 1 is an architecture diagram of a SDN network according to an example of the present disclosure. The SDN network includes a SDN controller 11 (hereinafter referred to as "controller") and SDN switches 12, 13, and 14 (hereinafter referred to as "switch") for providing packet-forwarding services in the SDN network. The switch 12 may include a processor 121, a storage 122, a forwarding chip 123, and an internal bus 124. The switch 13 and the switch 14 may adopt the same hardware architecture as switch 13. In another example, the switch 12 may be a virtual switch achieved through virtualization. The controller 11 is a control centre of the whole SDN network, which can control the switches to forward various external packets by issuing a variety of flow entries. In the context of this disclosure the term "switch" is to be interpreted broadly and includes layer 2 switches, layer 3 switches, routers, firewalls and other network devices for forwarding traffic that are capable of operating based on a SDN protocol. This is consistent with the use of the term "switch" in a variety of popular SDN protocols (such as OpenFlow protocol).

A SDN switch may send packets which it does not know how to forward to a controller for further processing. The controller may determine a forwarding strategy for the packet and send a corresponding flow entry to the SDN switch.

Figure 2:
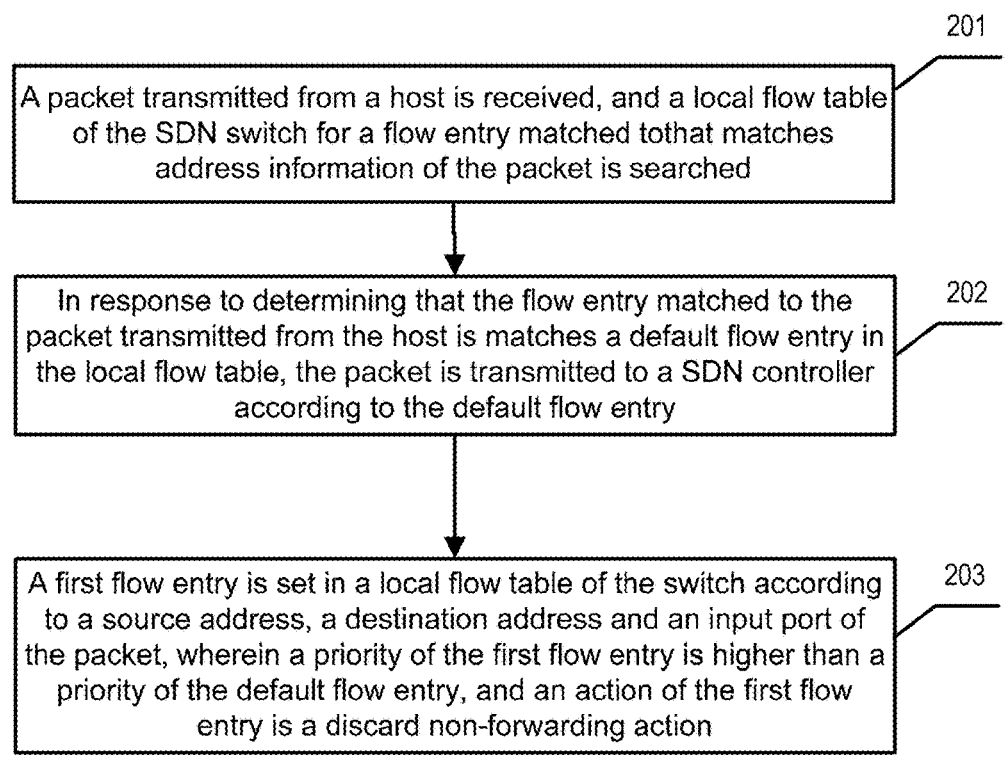
FIG. 2 is a flowchart illustrating the procedures of setting SDN flow entries according to an example of the present disclosure.

Please refer to FIG. 2. In an example, a method for setting SDN flow entries in a SDN switch is provided in the present disclosure The method described in FIG. 2 sets a flow entry with a non-forwarding action in a local flow table of the SDN switch. This may ease the burden on the controller by reducing or preventing multiple packets having the same address information being sent to the controller. The method is applied to a switch and may include the following.

At block 201, a packet transmitted from a host is received, and a local flow table of the SDN switch for a flow entry that matches address information of the packet is searched.

At block 202, in response to determining that the packet matches a default flow entry in the local flow table, the packet is transmitted to a SDN controller according to the default flow entry.

At block 203, a first flow entry is set in a local flow table of the switch according to a source address, a destination address and an input port of the packet, wherein a priority of the first flow entry is higher than a priority of the default flow entry, and an action of the first flow entry is a non-forwarding action.

In an example, after the switch 12 is added into the SDN network, the switch 12 will follow some predetermined mechanism to discover the controller 11 and establish a connection with the controller 11. After the switch 12 is connected to the controller 11, the controller 11 can perform basic interaction with the switch 12. The switch 12 may set a default flow entry in a local flow table of the switch. A default flow entry is a flow entry that sends data packets to the controller 11 for further processing. For example the default flow entry may match data packets that do not match other flow entries, or match all incoming data packets but have a low priority such that the default entry is used when there are no other matching flow entries. An example of a "default flow entry", is the Miss Rule Entry in the OpenFlow protocol. After the switch 12 turns into operation, the forwarding chip 123 (in another example, the forwarding chip 123 can also be a software-implemented packet-forwarding module) of the switch 12 has the default flow entry (such as, the Miss Rule Entry) at this time and does not have other flow entries. Therefore, regarding to forwarding the first data packet, when the forwarding chip 123 searches for matching flow entries, the first data packet will match the default flow entry and will not match other flow entries. Since the action of the default flow entry is an action for transmitting to controller, and the packet will be transmitted to the controller. Likewise, if the local flow table of the switch has several other flow entries, but the other flow entries do not match the packet, the default flow entry may match the packet and the packet may be sent to the controller for further processing in accordance with the default flow entry. In the rest of this disclosure the default flow entry may be referred to as a Miss Rule Entry for convenience, but should be interpreted as covering other similar types of default flow entry except where the context dictates otherwise.

In fact, the forwarding chip 123 will not use the Miss Rule Entry to provide packet-forwarding services under normal circumstances. A priority of the Miss Rule Entry is usually lower than other flow entries in the flow table. That is to say, only when no other matching flow entries with higher priority are found, the Miss Rule Entry will be matched. In this example, the processor 121 transmits the match failure packets during the forwarding process to the controller 11 based on the Miss Rule Entry, and also can set a first flow entry having a priority higher than the priority of the Miss Rule Entry. The first flow entry may include address information and a corresponding action, wherein the address information may include a source address, a destination address, and an input port, and its action may be a non-forwarding action. The address information here is actually common characteristics of a number of similar packets. Please refer to the example of Table 1. The address information can also be called as flow characteristic information, which usually comes from a head of the packet and may include address, port, and protocol characteristics, and etc. The role of the address information is to help the forwarding chip 123 to identify the packets from the same packet stream.

In an example, the non-forwarding action is a discard action. That is to say, the packet matched to the first flow entry will be discarded. Please refer to Table 1. The action column shown in Table 1 represents how the forwarding chip 123 of the switch 12 deals with the packet, the action of the first flow entry here is a discard action. In the example shown in Table 1, the switch 12 may discard the subsequently-received packets having the same address information from the same input port according to the first flow entry.

TABLE 1

| Source Address | Destination Address | Input Port | Action |
| --- | --- | --- | --- |
| 192.168.1.2 | 192.168.1.5 | 12 | Discard |

Since the controller provides services to a number of switches, the controller usually needs a certain period time to process the packets transmitted from the host to the controller. Before the processing result is transmitted from the controller to the switch, the controller may perform the same processes repeatedly if the switch continuously transmits the packets having the same address information to the controller. In this example, since the first flow entry is set in the switch, the packets having the same address information will not be transmitted to the controller anymore. Otherwise, the controller may need to perform a lot of the same processes repeatedly, which may occupy processing resources of the controller. In some extreme cases, an attacker may use this feature to attach the controller by occupying processing resources of the controller.

In another example, the non-forwarding action is buffering the packet transmitted from a host to a corresponding buffering queue of the first flow entry. During the process of setting the first flow entry, the corresponding buffering queue is assigned to the first flow entry. Similarly, if the prior art is adopted, the switch will continuously transmit the packets having the same address information to the controller before the processing result of the controller is transmitted to the switch. In this example, since the first flow entry is set in the switch, the same packets having the same address information will be buffered to the same buffering queue and will not be transmitted to the controller repeatedly. As can be seen from the abovementioned two examples, the first flow entry can effectively prevent potential attacks for occupying the controller's processing resources.

In an example, after the controller completes processing of the packet transmitted from the host, a second flow entry is generated. For the switch, the second flow entry is used as a basis for forwarding the packet. After the switch 12 receives the second flow entry, the processor 121 may set the second flow entry in internal storage of the forwarding chip 123 or entries of software forwarding modules. The Action of the second flow entry can be a forwarding action or a discarding action, or an even more complex action. In the following example, the Action of the second flow entry is a forwarding action, and the forwarding action can be understood as "being sent out from a designated output port". The forwarding chip 123 can directly forward the follow-up packets having the same address information.

In another example, since the resources for storing the flow entries are usually limited, the processor 121 may set a second predetermined aging period for the second flow entry. Before setting the second flow entry in the forwarding chip 123 (or forwarding module), the processor 121 may search whether the first flow entry has the same address information first. If yes, then the first flow entry is deleted, or the second flow entry is set by revising the first flow entry. That is to say, the second flow entry is used for overwriting the first flow entry, which can also achieve the goal of deleting the first flow entry. At this time, the first entry has already completed its mission and can be deleted.

In an example, the Action of the first flow entry is a buffering action. In response to determining that the address information of the second flow entry matches the address information of the first flow entry, the buffered packets in the corresponding buffering queue of the first flow entry can be processed first before deleting the first flow entry matched to the second flow entry. At this time, these packets can be processed according to the second flow entry since the second flow entry is transmitted from the controller to the switch for guiding the switch how to process the packets having specific address information. The Action of the second flow entry can be a discarding action or a forwarding action, or even a combined action including a variety of actions. In general, the Action of the second flow entry is a forwarding action. At this time, the switch may send out the buffered packets according to the second flow entry, which can reduce service/connection interruption risks resulted from discarding packets. In general, upper layer protocols (such as TCP) have reliable security mechanism, and thus buffering several packets in a short time will not cause service/connection interruptions.

In some cases, the controller 11 cannot immediately generate the second flow entry, and thus the switch cannot immediately receive the second flow entry. At this time, if the first flow entry still works, the packets received by the switch cannot be forwarded for a long time (can also be a discarding action or a buffering action). In order to prevent the abovementioned cases that the first flow entry works for a long time, the processor 121 may set a shorter first predetermined aging period to the first flow entry when setting the first flow entry. In an example, the first predetermined aging period is usually much smaller than the second predetermined aging period of the second flow entry. For example, the first predetermined aging period can be smaller than 10 seconds (such as, 5 seconds), while the second predetermined aging period can be larger than 1 minute (such as 2 minutes).

The aging process of the first flow entry can be implemented by an aging timer. When the aging time expires, the forwarding chip 123 can automatically delete the first flow entry. After the first flow entry is deleted, the same processing procedures will be repeated if the packet having the same address information is transmitted to the switch again. For example, at Block 202, the matched default flow entry is retransmitted to the controller 11. At this time, a new first flow entry will be set again. Since a period of time is passed, the controller 11 may have enough time to generate a second flow entry. If the controller 11 still cannot generate the second flow entry immediately, the same processing procedures mentioned above will be performed again.

A typical scenario is taken as an example below. Please refer to FIG. 3.

Figure 3:
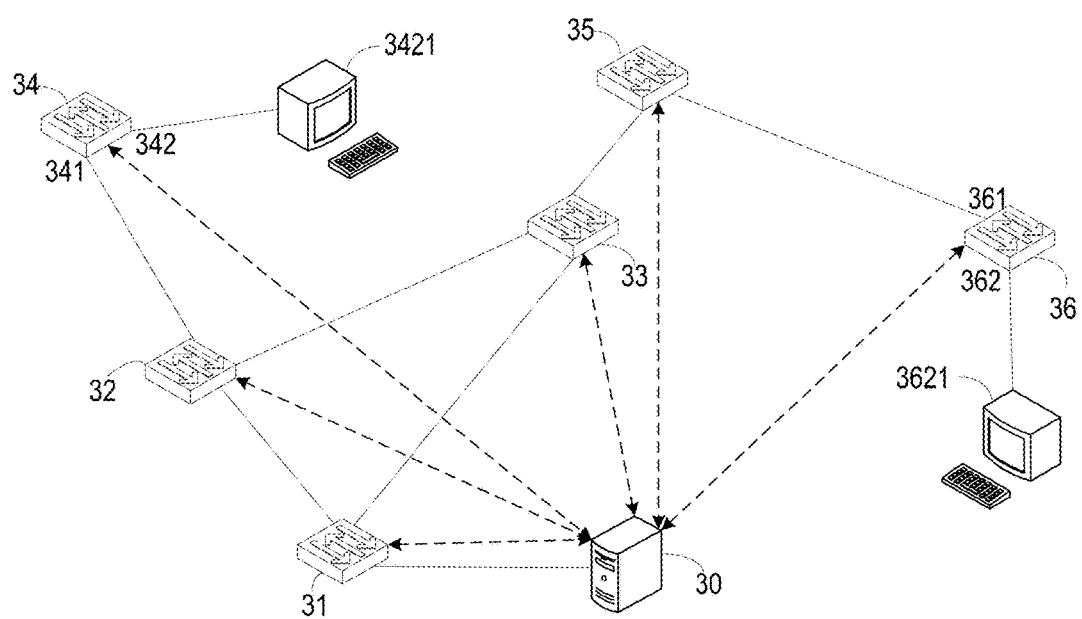
FIG. 3 is a diagram showing how to achieve a packet-forwarding processing a SDN network according to an example of the present disclosure.

As shown in FIG. 3, assume that the SDN network currently includes a controller 30 and a number of switches, such as a switch 31, a switch 32, a switch 33, a switch 34, a switch 35, and a switch 36, wherein the switch 34 is connected to a host 3421, and the switch 36 is connected to a host 3621. The controller 30 generates corresponding Miss Rule Entries for the switches 31-36, respectively, and transmits the corresponding Miss Rule Entries to the switches 31-36.

A port 342 of the switch 34 receives a packet 1 from the host 3421, wherein a source IP address of the packet 1 is IP1, a source MAC address of the packet 1 is MAC1, a destination IP address of the packet 1 is IP2, a destination MAC address is MAC2. The switch 34 does not search any flow entry that is matched to the destination IP address IP2 and the destination MAC address MAC2, and will forward the packet 1 to the controller 30 according to the Miss Rule Entry.

The switch 34 may set a first flow entry according to the port 342, the source address, and the destination address. For example, {Source IP address=IP1, Source MAC address=MAC1, Destination IP address=IP2, Destination MAC address=MAC2, Input Port=Port342, Action=Discard}. In another example, the action column here can be an action for buffering to a corresponding buffering queue.

Assume that the switch 32 and the switch 31, who is located on the forwarding path between the switch 34 and the controller 30, receive the packet 1 transmitted from the switch 34 to the controller 30, the switch 32 and the switch 31 will transmit the packet 1 to the controller 30 according to the Miss Rule Entry and will set their corresponding first flow entry based on the source address, the destination address, and the input port of the packet 1.

The controller 30 may generate a Host Entry according to the source IP address IP1, the source MAC address MAC1 and the port 342 of the received packet 1. Since other Host Entries matched to the destination IP address IP2 and the destination MAC address MAC2 of the packet 1 are not searched, the controller 30 cannot generate a second flow entry immediately. Hence, in this switch example, the controller 30 broadcasts the received packet 1.

A port 362 of the switch 36 receives a packet 2 from the host 3621, wherein a source IP address of the packet 2 is IP2, a source MAC address of the packet 2 is MAC2, a destination IP address of the packet 2 is IP1, a destination MAC address is MAC1; that is to say, the packet 2 is a response packet of the packet 1.

The switch 36 does not search any entries matched to the destination IP address IP1 and the destination MAC address MAC1, and will transmit the packet 2 to the controller 30 according to the Miss Rule Entry. The switch 36 will set a first flow entry according to the input port 362, the source address, and the destination address of the packet 2. For example, {Source IP address=IP2, Source MAC address=MAC2, Destination IP address=IP1, Destination MAC address=MAC1, Input port=Port362, Action=Discard}. In another example, the action column here can be an action for buffering to a corresponding buffering queue.

Similarly, assume that the switch 33 and the switch 35, who is located on the forwarding path between the switch 36 and the controller 30, receive the packet 2 transmitted from the switch 36 to the controller 30, the switch 33 and the switch 35 will transmit the packet 2 to the controller 30 according to the Miss Rule Entry and will set their corresponding first flow entry based on the source address, the destination address, and the input port of the packet 2.

After the controller 30 received the packet 2 transmitted from the switch 36, the controller 30 will generate a Host Entry according to the source IP address IP2, the source MAC address MAC2, and the input port 362 of the packet 2. Since the controller 30 can search the Host Entry (i.e., the Host Entry of the host 3421) matched to the destination IP address IP1 and the destination MAC address MAC1 of the packet 2, the controller 30 can determine that the packet 2 is transmitted from the port 342 of the switch 34 to the host 3421.

The controller 30 may calculate the forwarding path of the packet 2 based on SDN network topology, such as, Switch 36-Switch 35-Switch 33-Switch 32-Switch 34.

The controller 30 may calculate the second flow entries for each of the switches located on the forwarding path of the packet 2. The controller 30 may generate the second flow entry corresponding to the packet 2 for the switch 36. For example, {Source IP address=IP2, Source MAC address=MAC2, Destination IP address=IP1, Destination MAC address=MAC1, Output Port=Port361}. Be noted that, "Output Port=Port 361" means that the packet is forwarded from Port 361, which represents the action of the flow entry. The controller 30 may generate the second flow entry corresponding to the packet 2 for the switch 34. For example, {Source IP address=IP2, Source MAC address=MAC2, Destination IP address=IP1, Destination MAC address=MAC1, Output Port=Port342}. Since the setting method that the controller 30 sets the second flow entries corresponding to the second packet 2 for the switch 35, the switch 33, and the switch 32 is the same as the abovementioned setting method, further description is omitted here.

These second flow entries generated by the controller 30 will be transmitted to the switches corresponding to the packet 2. After the switch 36 received the second flow entry corresponding to the packet 2 from the controller 30, the switch 36 will search the address information of the first flow entry matched to the source IP address IP2, the source MAC address MAC2, the destination IP address IP1, and the destination MAC address MAC1: {Source IP address=IP2, Source MAC address=MAC2, Destination IP address=IP1, Destination MAC address=MAC1, Input Port=Port362}. In an example, the first flow entry is revised to {Source IP address=IP2, Source MAC address=MAC2, Destination IP address=IP1, Destination MAC address=MAC1, Output Port=Port361} based on the second flow entry of the received packet 2, which is equivalent to delete the first flow entry corresponding to the packet 2. Since the revising way for revising the first flow entries of the switch 35 and the switch 33 is similar to the revising way for revising the first flow entry of the switch 36, further description is omitted here. Be noted that, if the packet 2 is buffered in a corresponding buffering queue of the to-be-deleted first flow entry at this time, these packet 2 can be deleted based on the second flow entry of the packet 2. In this example, these packets 2 will be forwarded from the Port 361.

Similarly, after the switch 34 received the second flow entry of the packet 2 from the controller 30, the switch 34 will record the second flow entry of the packet 2. For example, {Source IP address=IP2, Source MAC address=MAC2, Destination IP address=IP1, Destination MAC address=MAC1, Output Port=Port342}. Since the recording way of the switch 32 is the same as the abovementioned recording way, further description is omitted here.

When the switch 36 receives the packet 2 through the port 362 again, the switch 36 will forward the packet 2 based on the second flow entry {Source IP address=IP2, Source MAC address=MAC2, Destination IP address=IP1, Destination MAC address=MAC1, Output Port=Port361} of the packet 2. The packet 2 will be transmitted to the switch 34 along the forwarding path. The switch 34 then transmits the packet 2 to the host 3421 based on the flow entry {Source IP address=IP2, Source MAC address=MAC2, Destination IP address=IP1, Destination MAC address=MAC1, Output Port=Port342}.

Before a first predetermined aging period of the first flow entry of the packet 1 expires, the switch 34 may discard or buffer the received packet 1 based on the first flow entry. This can avoid transmitting the packet 1 to the controller 30 repeatedly during the first predetermined aging period can avoid generate the same flow entries repeatedly, which improves efficiency of the controller 30.

The switch 34 deletes the first flow entry of the packet 1 when the first predetermined aging period expires, such as, {Source IP address=IP1, Source MAC address=MAC1, Destination IP address=IP2, Destination MAC address=MAC2, Output Port=Port342, Action=Discard}. When the port 342 of the switch 34 receives the packet 1 again, the switch will transmit the packet 1 to the controller 30 based on the Miss Rule Entry, and will set the first flow entry, such as, {Source IP address=IP1, Source MAC address=MAC1, Destination IP address=IP2, Destination MAC address=MAC2, Input Port=Port342, Action=Discard}. In another example, the action column here can be an action for buffering the packet 1 to a corresponding buffering queue.

The controller 30 may search the non-aging Host Entry corresponding to the source IP address IP1, the source MAC address MAC 1, and the input port 362 based on the packet 1 from the switch 34, and will not generate the corresponding Host Entry repeatedly. The controller 30 may search the Host Entry matched to the destination IP address IP2 and the destination MAC address MAC2 of the packet 1, and may determine that the packet 1 is transmitted from the port 362 of the switch 36 to the host 3621.

The controller 30 may calculate the forwarding path of the packet 1 based on SDN network topology, such as, Switch 34-Switch 32-Switch 33-Switch 35-Switch 36.

The controller 30 may calculate the flow entries for each of the switches located on the forwarding path of the packet 1. The controller 30 may generate the second flow entry corresponding to the packet 1 for the switch 34. For example, {Source IP address=IP1, Source MAC address=MAC1, Destination IP address=IP2, Destination MAC address=MAC2, Output Port=Port341}. Be noted that, "Output Port=Port 361" means that the packet is forwarded from Port 361, which represents the action of the flow entry. The controller 30 may generate the second flow entry corresponding to the packet 1 for the switch 36. For example, {Source IP address=IP1, Source MAC address=MAC1, Destination IP address=IP2, Destination MAC address=MAC2, Output Port=Port362}. Since the generating way that the controller 30 generates the second flow entries corresponding to the second packet 1 for the switch 32, the switch 33, and the switch 35 is the same as the abovementioned generating way, further description is omitted here.

These second flow entries generated by the controller 30 will be transmitted to the switches corresponding to the packet 1. After the switch 34 received the second flow entry corresponding to the packet 1 from the controller 30, the switch 34 will search the address information of the first flow entry matched to the source IP address IP1, the source MAC address MAC1, the destination IP address IP2, and the destination MAC address MAC2: {Source IP address=IP1, Source MAC address=MAC1, Destination IP address=IP2, Destination MAC address=MAC2, Input Port=Port342}. In an example, the second flow entry is revised to {Source IP address=IP1, Source MAC address=MAC1, Destination IP address=IP2, Destination MAC address=MAC2, Output Port=Port341} based on the second flow entry of the received packet 1. Since the revising way for revising the first flow entries of the switches 32, 33, and 35 is similar to the revising way for revising the first flow entry of the switch 34, further description is omitted here. In another example, the packets to be buffered in the buffering queue can be deleted, and further description is omitted here.

Similarly, after the switch 36 received the second flow entry of the packet 1 from the controller 30, the switch 36 will record the second flow entry of the packet 1. For example, {Source IP address=IP1, Source MAC address=MAC1, Destination IP address=IP2, Destination MAC address=MAC2, Output Port=Port362}. Since the recording way of the switches 32, 33, and 35 is the same as the abovementioned recording way, further description is omitted here.

When the switch 34 receives the packet 1 through the port 342 again, the switch 34 will forward the packet 1 based on the second flow entry {Source IP address=IP1, Source MAC address=MAC1, Destination IP address=IP2, Destination MAC address=MAC2, Output Port=Port341} of the packet 1. The packet 1 will be transmitted to the port 361 of the switch 36 along the forwarding path. The switch 36 then transmits the packet 1 to the host 3621 based on the second flow entry {Source IP address=IP1, Source MAC address=MAC1, Destination IP address=IP2, Destination MAC address=MAC2, Output Port=Port362}.

The second flow entry can be deleted when a second predetermined aging period of the second flow entry of the switch expires. Be noted that, the second predetermined aging period for each switch may be different from each other. In another example, the aging of the second flow entry can be controlled by the controller 30, that is, the controller 30 may transmit the aging information of the second flow entry to the switch, and may ask the switch to delete the second flow entry corresponding to the aging information. For example, the controller 30 may delete the Host Entry wen the predetermined aging period (such as, 5 minutes) expires, and may notify the corresponding switches 36 and 34 to delete the flow entries to make sure that the corresponding flow entries can be automatically deleted after the flow is terminated. Through these aging mechanisms, internal storage resources of forwarding chips or forwarding modules of the switches can be further saved in order to avoid useless flow entries from occupying these storage resources.

Figure 4:
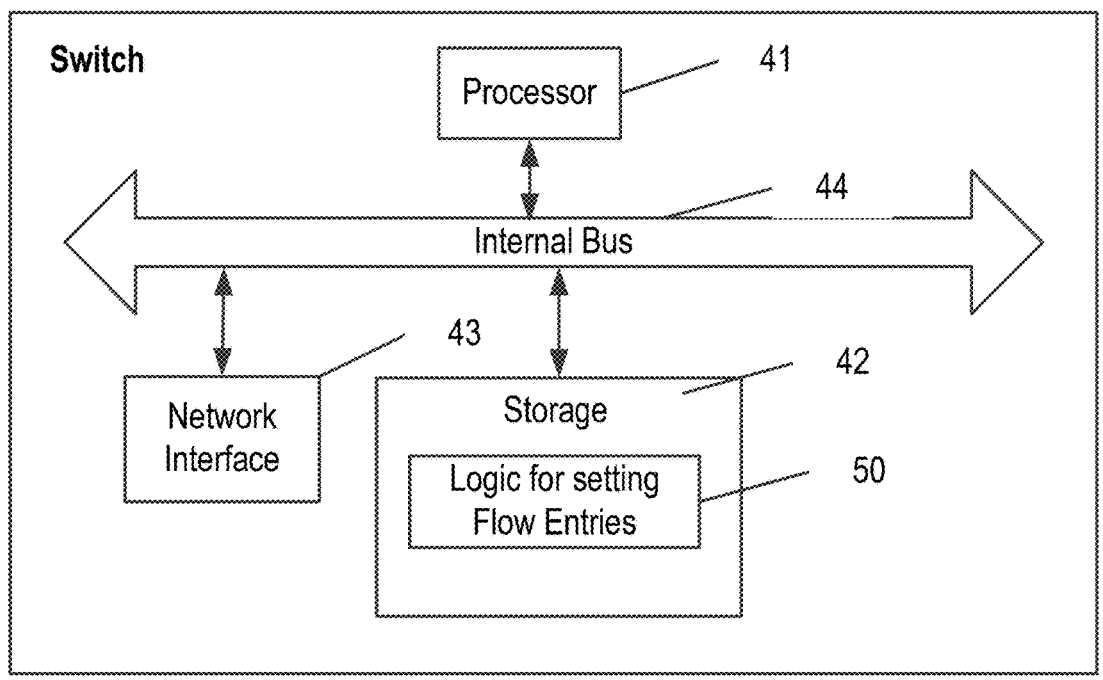
FIG. 4 is a hardware architecture diagram of a switch running a logic for setting SDN flow entries according to an example of the present disclosure.
Figure 5:
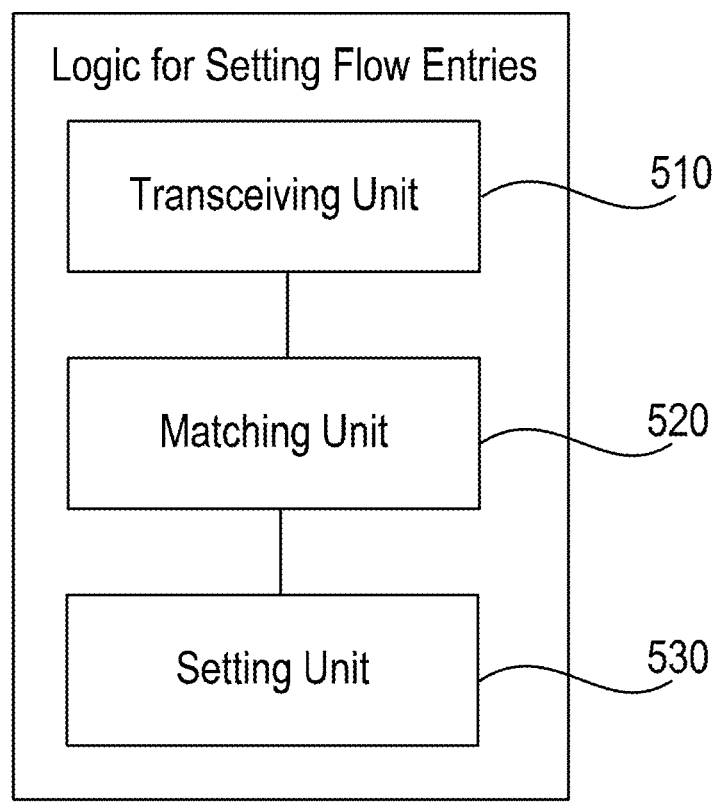
FIG. 5 is a block diagram of logic for setting SDN flow entries according to an example of the present disclosure.

In response to the abovementioned method, a logic for setting SDN flow entries is provided in the present disclosure, wherein the logic is applied to a SDN switch. As shown in FIG. 4, the hardware architecture of the switch running the logic 50 for setting SDN flow entries may include a processor such as a CPU 41, a storage 42, a network interface 43, and an internal bus 44. As shown in FIG. 5, the logic 50 may further include a transceiving unit 510, a matching unit 520, and a setting unit 530.

The transceiving unit 510 is used for receiving a packet transmitted from a host and searching a local flow table of the switch for a flow entry that matches address information of the packet.

The matching unit 520 is used for transmitting the packet to a SDN controller according to the default flow entry in response to determining that the packet matches a default flow entry in the local flow table.

The setting unit 530 is used for setting a first flow entry in the local flow table according to a source address, a destination address and an input port of the packet, wherein a priority of the first flow entry is higher than a priority of the default flow entry, and an action of the first flow entry is a non-forwarding action.

In an example, the setting unit 530 is further used for preserving a second flow entry of the packet transmitted from the SDN controller, wherein a priority of the second flow entry is higher than the priority of the first flow entry; and deleting the first flow entry matched to the second flow entry in response to determining that address information of the second flow entry of the packet matches the address information of the first flow entry.

In an example, the non-forwarding action includes: discarding the packet transmitted from the host, or buffering the packet to a corresponding buffering queue of the first flow entry.

In an example, when the non-forwarding action is buffering the packet transmitted from the host to the corresponding buffering queue of the first flow entry, the switch further includes a buffering unit for assigning the corresponding buffering queue to the first flow entry, and buffering the packet transmitted from the host to the corresponding buffering queue of the first flow entry.

In an example, the setting unit 530 is further used for: processing the buffered packet matched to the first flow entry according to the second flow entry and then deleting the first flow entry in response to determining that the address information of the received second flow entry matches the address information of the first flow entry.

In an example, the logic 50 further includes a timer unit for: setting a first predetermined aging period for the first flow entry when setting the first flow entry; and when the first predetermined aging period expires, deleting the first flow entry.

In an example, the timer unit is further used for setting a second predetermined aging period for the second flow entry, wherein the first predetermined aging period is smaller than the second predetermined aging period of the second flow entry.

The following example is implemented by software, which further describes how the switch runs the logic for setting SDN flow entries. In this example, the logic 50 of the present disclosure should be understood as computer readable instructions stored in the storage. When the switch is running the logic 50, its CPU may read and execute the computer readable instructions corresponding to the logic 50 stored in the storage so as to implement the following actions.

Receive a packet transmitted from a host, and search a local flow table of the switch for a flow entry that matches address information of the packet;

in response to determining that the packet matches a default flow entry in the local flow table, transmit the packet to a SDN controller according to the default flow entry; and set a first flow entry in the local flow table according to a source address, a destination address and an input port of the packet, wherein a priority of the first flow entry is higher than a priority of the default flow entry, and an action of the first flow entry is a non-forwarding action.

In an example, the CPU may read and execute the computer readable instructions corresponding to the logic 50 for setting flow entries so as to implement the following actions.

Preserve a second flow entry of the packet transmitted from the SDN controller, wherein a priority of the second flow entry is higher than the priority of the first flow entry; and In response to determining that address information of the second flow entry of the packet matches the address information of the first flow entry, delete the first flow entry matched to the second flow entry.

In an example, the CPU could read the computer readable instructions corresponding to the logic 50 for setting flow entries to execute the process of performing the non-forwarding action, the process may include:

discarding the packet transmitted from the host, or buffer the packet transmitted from the host to a corresponding buffering queue of the first flow entry.

assigning the corresponding buffering queue to the first flow entry; and buffering the packet transmitted from the host to the corresponding buffering queue of the first flow entry.

In an example, when the non-forwarding action is buffering the packet transmitted from the host to the corresponding buffering queue of the first flow entry, the CPU may execute the computer readable instructions corresponding to the logic 50 for setting flow entries so as to implement the following actions.

In an example, the CPU may read and execute the computer readable instructions corresponding to the logic 50 for setting flow entries so as to implement the following actions.

In response to determining that the address information of the received second flow entry matches the address information of the first flow entry, the buffered packet matched to the first flow entry may be processed according to the second flow entry and then delete the first flow entry.

In an example, the CPU may read and execute the computer readable instructions corresponding to the logic 50 for setting flow entries so as to implement the following actions.

Set a first predetermined aging period for the first flow entry when setting the first flow entry; and when the first predetermined aging period expires, delete the first flow entry.

In an example, the CPU may read and execute the computer readable instructions corresponding to the logic 50 for setting flow entries so as to implement the following actions.

Set a second predetermined aging period for the second flow entry, wherein the first predetermined aging period is smaller than the second predetermined aging period of the second flow entry.

The figures are illustrations of an example, wherein the units or procedure shown in the figures are not necessarily essential for implementing the disclosure. The units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the disclosure.

Throughout the disclosure, the word "comprise", or variations such as "comprises" or "comprising", will be understood to imply the inclusion of a stated element, integer, block, or group of elements, integers, block, but not the exclusion of any other element, integer or block, or group of elements, integers or blocks.

Numerous variations and/or modifications may be made to the above-described examples, without departing from the broad general scope of the disclosure. The examples are, therefore, to be considered in all respects as illustrative and not restrictive.

The invention claimed is:

1. A method for setting software defined network (SDN) flow entries, applied to a SDN switch, comprising:
   receiving a packet transmitted from a host, and searching a local flow table of the SDN switch for a flow entry that matches address information of the packet;
   in response to determining that the packet matches a default flow entry in the local flow table, transmitting the packet to a SDN controller according to the default flow entry; and
   setting a first flow entry in the local flow table according to a source address, a destination address and an input port of the packet, wherein a priority of the first flow entry is higher than a priority of the default flow entry, and an action of the first flow entry is a non-forwarding action.

2. The method according to claim 1, further comprising:
   receiving, from the SDN controller, a second flow entry matching the packet and setting the second flow entry in the local flow table of the SDN switch, wherein a priority of the second flow entry is higher than the priority of the first flow entry.

3. The method according to claim 2, further comprising:
   in response to determining that address information of the second flow entry matches address information of the first flow entry, deleting the first flow entry or setting the second flow entry by overwriting the first entry.

4. The method according to claim 2, wherein the non-forwarding action comprises: discarding the packet transmitted from the host, or buffering the packet to a corresponding buffering queue of the first flow entry.

5. The method according to claim 4, wherein when the non-forwarding action is buffering the packet transmitted from the host to the corresponding buffering queue of the first flow entry, the method further comprising:
   assigning the corresponding buffering queue to the first flow entry; and
   buffering the packet transmitted from the host to the corresponding buffering queue of the first flow entry.

6. The method according to claim 5, further comprising:
   in response to determining that the address information of the received second flow entry matches the address information of the first flow entry, processing the buffered packet matched to the first flow entry according to the second flow entry and then deleting the first flow entry.

7. The method according to claim 2, further comprising:
   setting a first predetermined aging period for the first flow entry when setting the first flow entry; and
   when the first predetermined aging period expires, deleting the first flow entry.

8. The method according to claim 7, further comprising:
   setting a second predetermined aging period for the second flow entry, wherein the first predetermined aging period is smaller than the second predetermined aging period of the second flow entry.

9. A switch having a processor and a storage for storing a logic for setting flow entries, wherein the logic comprises machine readable instructions that are executable by the processor to:
   receive a packet transmitted from a host, and search a local flow table of the switch for a flow entry that matches address information of the packet;
   in response to determining that the packet matches a default flow entry in the local flow table, transmit the packet to a software defined network (SDN) controller according to the default flow entry; and
   set a first flow entry in the local flow table according to a source address, a destination address and an input port of the packet, wherein a priority of the first flow entry is higher than a priority of the default flow entry, and an action of the first flow entry is a non-forwarding action.

10. The switch according to claim 9, wherein the machine readable instructions include instructions to:
    receive, from the SDN controller, a second flow entry matching the packet and set the second flow entry in the local flow table of the switch, wherein a priority of the second flow entry is higher than the priority of the first flow entry.

11. The switch according to claim 10, wherein the machine readable instructions include instructions to:
    in response to determining that address information of the second flow entry matches address information of the first flow entry, delete the first flow entry or set the second flow entry by overwriting the first entry.

12. The switch according to claim 10, wherein the machine readable instructions include instructions to:
    discard the packet transmitted from the host, or buffer the packet transmitted from the host to a corresponding buffering queue of the first flow entry.

13. The switch according to claim 12, wherein the machine readable instructions include instructions to:
    assign the corresponding buffering queue to the first flow entry; and
    buffer the packet transmitted from the host to the corresponding buffering queue of the first flow entry.

14. The switch according to claim 13, wherein the machine readable instructions include instructions to:
    in response to determining that the address information of the received second flow entry matches the address information of the first flow entry, process the buffered packet matched to the first flow entry according to the second flow entry and then delete the first flow entry.

15. The switch according to claim 10, wherein the machine readable instructions include instructions to:
    set a first predetermined aging period for the first flow entry when setting the first flow entry; and
    when the first predetermined aging period expires, delete the first flow entry.

16. The switch according to claim 15, wherein the machine readable instructions include instructions to:
    set a second predetermined aging period for the second flow entry, wherein the first predetermined aging period is smaller than the second predetermined aging period of the second flow entry.

\* \* \* \* \*